United States Patent
Strothmann

(10) Patent No.: US 9,459,122 B2
(45) Date of Patent: Oct. 4, 2016

(54) METHOD FOR DETERMINING THE POSITION OF THE ROTOR OF AN ELECTRICAL MACHINE

(76) Inventor: Rolf Strothmann, Saarbrücken (DE)

( * ) Notice: Subject to any disclaimer, the term of this patent is extended or adjusted under 35 U.S.C. 154(b) by 145 days.

(21) Appl. No.: 13/980,156

(22) PCT Filed: Jan. 16, 2012

(86) PCT No.: PCT/DE2012/100009
§ 371 (c)(1),
(2), (4) Date: Jul. 17, 2013

(87) PCT Pub. No.: WO2012/097807
PCT Pub. Date: Jul. 26, 2012

(65) Prior Publication Data
US 2015/0061641 A1 Mar. 5, 2015

(30) Foreign Application Priority Data

Jan. 17, 2011 (DE) .................. 10 2011 008 756

(51) Int. Cl.
*G01D 5/243* (2006.01)
*H02P 6/18* (2016.01)

(52) U.S. Cl.
CPC .............. *G01D 5/243* (2013.01); *H02P 6/186* (2013.01); *H02P 2203/01* (2013.01); *H02P 2203/09* (2013.01)

(58) Field of Classification Search
USPC .............. 324/76.77, 207.25, 207.13, 207.16;
318/400.33, 379, 400.26, 135, 466,
318/496, 811, 721, 715; 702/151, 94;
29/598
See application file for complete search history.

(56) References Cited

U.S. PATENT DOCUMENTS

| | | | | |
|---|---|---|---|---|
| 5,191,270 A | * | 3/1993 | McCormack | H02P 6/22 318/400.11 |
| 5,854,548 A | * | 12/1998 | Taga | H02P 6/185 318/400.12 |
| 6,366,037 B1 | | 4/2002 | Strothmann | |
| 6,771,039 B2 | * | 8/2004 | Sakurai et al. | 318/722 |
| 2005/0007044 A1 | * | 1/2005 | Qiu et al. | 318/254 |
| 2009/0261765 A1 | | 10/2009 | Stoiber et al. | |
| 2009/0278485 A1 | * | 11/2009 | Strothmann | 318/400.33 |
| 2010/0262307 A1 | * | 10/2010 | Imura | 700/287 |
| 2011/0057593 A1 | * | 3/2011 | Williams et al. | 318/400.26 |
| 2011/0101900 A1 | | 5/2011 | Basic et al. | |
| 2011/0273168 A1 | * | 11/2011 | Strothmann | H02P 6/185 324/207.25 |

FOREIGN PATENT DOCUMENTS

| | | |
|---|---|---|
| DE | 102006020676 A | 11/2006 |
| DE | 102007028384 | 12/2008 |
| DE | 102008027720 A | 12/2009 |
| EP | 1005716 B1 | 11/2001 |
| EP | 21608312 A2 | 3/2010 |
| WO | 2010000640 | 1/2010 |

* cited by examiner

*Primary Examiner* — Melissa Koval
*Assistant Examiner* — Nasima Monsur
(74) *Attorney, Agent, or Firm* — Lucas & Mercanti, LLP; Klaus P. Stoffel

(57) ABSTRACT

A method for determining the position of the rotor of an electric machine having multiple phases in relation to the stator. The change $\Delta\dot{I}$ in the time derivative $\dot{I}$ of the current I flowing through at least one of the power inputs is determined. The change $\Delta\dot{I}$ is caused by a change $\Delta U$ in the potential U on at least one of the power inputs of the electric machine. A measurement signal that is representative of a position of the rotor is determined from multiple simultaneously or successively determined changes $\Delta\dot{I}$.

12 Claims, 2 Drawing Sheets

METHOD FOR DETERMINING THE POSITION OF THE ROTOR OF AN ELECTRICAL MACHINE

The present application is a 371 of International application PCT/DE2012/100009, filed Jan. 16, 2012, which claims priority of DE 10 2011 008 756.7, filed Jan. 17, 2011, the priority of these applications is hereby claimed and these applications are incorporated herein by reference.

BACKGROUND OF THE INVENTION

The invention relates to a method for determining the position of the rotor of an electrical machine having several phase strands, in relation to the stator, and an apparatus for carrying out the method.

EP 1 005 716 B1 discloses a method for determining the position of the rotor of an electrical machine, wherein the changes of the potential at the star point caused by changes of the potential of the rotor at the current supply inputs are utilized for determining a signal which is representative for the rotor position.

The invention is based on the object of creating a novel method for determining the position of the rotor of an electrical machine which can be carried without picking up an electrical value within the electrical machine.

SUMMARY OF THE INVENTION

The method according to the invention which meets this object is characterized in that, for at least one of the current supply inputs of the electrical machine, a change $\Delta\dot{I}$ of the time derivation $\dot{I}$ of the current flowing through the respective current supply input is determined as a result of a change $\Delta U$ of the potential U on at least one of the current supply inputs of the electrical machine, and a signal representative for the position of the rotor is determined from several changes $\Delta\dot{I}$ occurring simultaneously or successively.

In accordance with the invention, the determination of the position of the rotor takes place exclusively with the aid of currents which can be measured outside of the electrical machine and with changeable voltages.

Preferably, inductivity of one or more phase strands or/and a quotient of these inductivities at a given time are determined as representative measurement signals.

The change $\Delta U$ of the potential U takes place within such a short period of time that voltages induced in the phase strands in the meantime and currents flowing through the current supply inputs do not noticeably change.

The phase strands can be switched in a star configuration or/and in a triangular configuration.

Preferably, the change $\Delta U$ of the potential U from a potential zero point to a direct voltage takes place, particularly a battery voltage, or vice versa.

In accordance with a particularly preferred embodiment, the change $\Delta U$ of the potential U takes place within the scope of a current supply of the electrical machine through pulse width modulation (PWM). The determination of the position now does not require an intervention in the electrical machine itself, or in the manner of operation thereof.

The change $\Delta\dot{I}$ can be determined, for example, by means of a measuring transformer which, for example, produces a voltage signal which may have to be reinforced. For example, in the case of a voltage switch occurring within the scope of the pulse width modulation, a voltage leap results at the secondary winding of the measuring transformer which corresponds to the voltage leap during switching.

Several changes $\Delta\dot{I}$ caused by several potential changes $\Delta U$ can be determined for only one of the current supply inputs. The expenses for measurement circuits are correspondingly low. Alternatively, in the extreme case, changes $\Delta\dot{I}$ affected by a single potential change $\Delta U$ can be determined for several current supply inputs, so that a measuring circuit is required for each current supply input.

In accordance with a preferred embodiment of the invention, the representative measuring signal is determined from equations which contain the sum of the voltage components over the individual phase strands prior to and after the voltage change.

In the following the invention will be explained in more detail with the aid of embodiments and the enclosed drawing which refers to these embodiments. In the drawing:

DETAILED DESCRIPTION OF THE INVENTION

Figure 1:
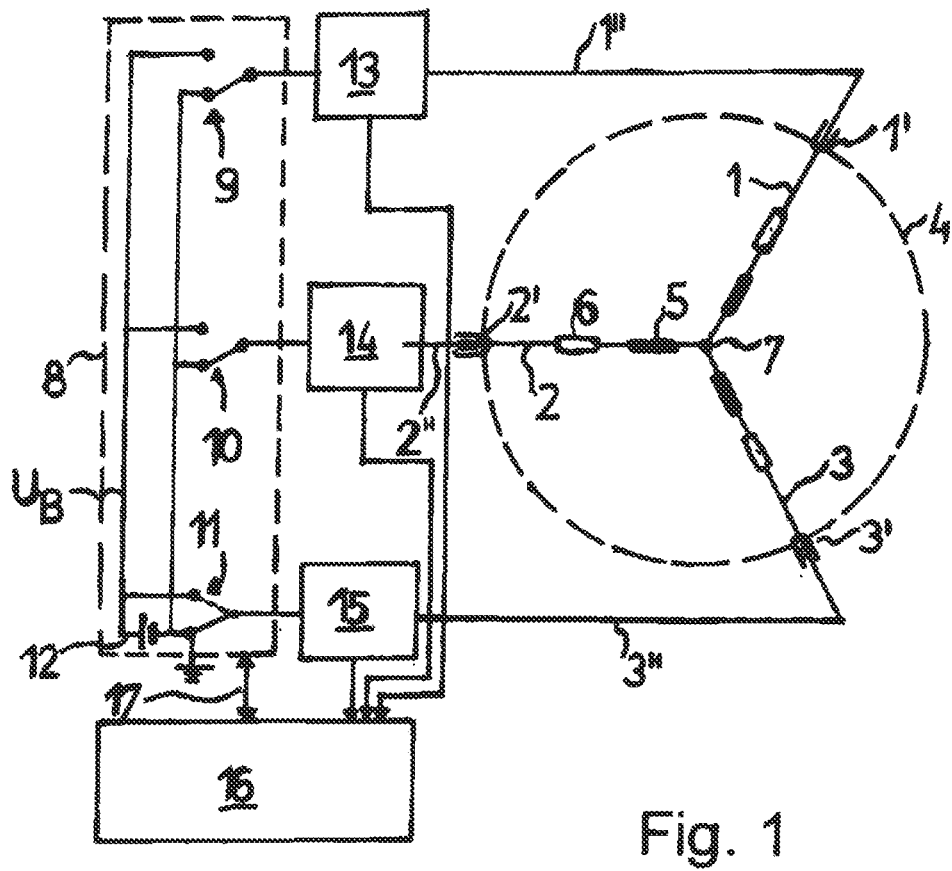
FIG. 1 shows a schematic illustration of an electrical machine with phase strands switched in a star configuration and devices for determining the position of the rotor in accordance with the method of the invention.

Three phase strands 1, 2, 3 of an electrical machine 4 switched in a star configuration each form an inductive resistance 5 and an ohmic resistance 6. The ends of the phase strands 1, 2, 3 facing away from the star point 7 are connected to connections 1', 2', 3' for current supply lines 1", 2", 3".

A current supply device 8 connects the current supply lines 1", 2", 3" through switching devices 9 to 11 with the direct voltage $U_B$ of a battery 12 or the voltage zero point corresponding to the pulse width modulation method (PWM-Method).

Measuring devices 13 to 15 in the current supply lines 1", 2", 3" serve for determining changes $\Delta\dot{I}$, i.e. changes of the first derivation of the current I flowing through the respective current supply line over time. This refers to short changes which result from switching by the switching devices 9 to 11.

The measurement devices 13 to 15 are in connection with an evaluating device 16 which, in turn, is connected to the current supply device 8 through a control line 17.

Figure 2:
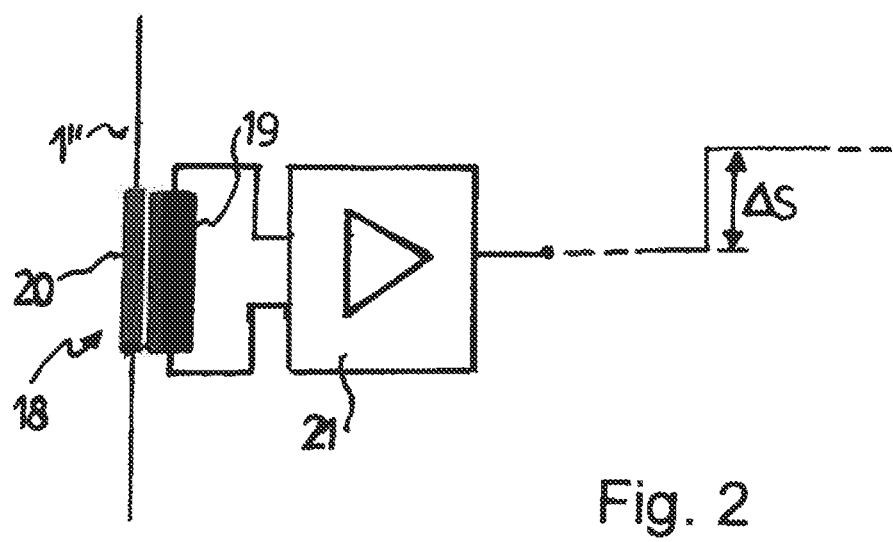
FIG. 2 shows a measuring device for determining changes $\Delta\dot{I}$ of the time derivation $\dot{I}$ of the current I in a phase strand.

As illustrated in FIG. 2, the measuring devices 13, 14, 15 may have, for example, a measuring transformer 18 whose secondary winding 19 delivers a measurement for $\dot{I}$, i.e. the first derivation of the current I over time. An amplifier 21 ensures that the inductivity of the primary winding 20 can be small in comparison to the inductivity of the phase strands 1, 2, 3.

With respect to the voltages $U_1$ applied to the individual phase strands $\dot{I}$ ($\dot{I}$=1, 2, 3), the following is true at any point in time:

$$U_1 = U_{i\,ind} + L_i \dot{I}_i + R_i I_i \qquad (1),$$

wherein $U_{i\ ind}$ denotes the voltage induced in the phase strand i, $L_i$ denotes the inductivity of the phase strand i, and $R_i$ denotes the ohmic resistance thereof.

Depending on whether the battery voltage $U_B$ or the voltage zero point contact the phase strand i, $U_i=0$, $U_i=U_S$, $U_i=U_B-U_S$, or $U_i=U_S-U_B$, wherein $U_S$ refers to the potential at the star point 7.

For example, if starting from a switching state in which all three phase strands 1, 2, 3 are connected to the voltage zero point, the following applies:

$$0 = U_{1\ ind} + L_1\dot{I}_1 + R_1 I_1 \quad (2)$$

$$0 = U_{2\ ind} + L_2\dot{I}_2 + R_2 I_2 \quad (3)$$

$$0 = U_{3\ ind} + L_3\dot{I}_3 + R_3 I_3 \quad (4).$$

The ohmic resistances $R_i$ can be considered as being equal and they can be considered to be constant during motor operation of the electrical machine. On the other hand, the inductivities $L_i$ depend on the respective influence of the exciter field and, thus, on the position of the rotor relative to the magnetizations of the pole winding cores. Within half a magnetic period there is always an unequivocal relationship between the inductivity of the phase strands and the position of the rotor which can be utilized for determining the position, as will be explained in the following.

After switching, for example, the phase strand 3 to the battery voltage $U_B$ by means of the switching device 11, the following result is obtained:

$$U_S = U_{1\ ind'} + L_1 \dot{I}_{1'} + R_1 I_{1'} \quad (5)$$

$$U_S = U_{2\ ind'} + L_2 \dot{I}_{2'} + R_2 I_{2'} \quad (6)$$

$$U_B - U_S = U_{3\ ind'} + L_3 \dot{I}_{3'} + R_3 I_{3'} \quad (7).$$

The change of the switching state characterized by the equations (2) to (4) into the switching state according to the equations (5) to (7) takes place so quickly that neither the voltages $U_{1\ ind}$ induced in the phase strands nor the currents I change significantly so that $U_{i\ ind} = U_{i\ ind'}$ and $R_i \dot{I}_1 + R_1 I_1$. The switch essentially only has an effect on $\dot{i}_i$ ie., the first derivation of the currents over time. By subtracting (2)–(5), (3)–(6) and (4)–(7), the following is obtained.

$$L_1(\dot{I}_1 - \dot{I}_{1'}) = L_1 \bullet \Delta \dot{I}_1 = U_S \quad (8)$$

$$L_2(\dot{I}_2 - \dot{I}_{2'}) = L_2 \bullet \Delta \dot{I}_2 = U_S \quad (9)$$

$$L_3(\dot{I}_3 - \dot{I}_{3'}) = L_3 \bullet \Delta \dot{I}_3 = U_B - U_S \quad (10).$$

The values $\Delta\dot{I}_1$, $\Delta\dot{I}_2$, $\Delta\dot{I}_3$ can be determined by means of the measuring devices 13 to 15. In the three equations (8) to (10), the inductivities $L_1$, $L_2$ and $L_3$ as well as the potential $U_S$ at the star point are then unknown.

From the three equations (8) to (10), the ratios $L_1/L_2$, $L_1/L_3$, $L_2/L_3$ can be determined while eliminating $U_S$ which each represent a dimension for the position of the rotor within half a magnetic period.

In addition, the following applies to the above described switch:

$$U_B = (L_3 + 1/(1/L_1 + 1/L_2)) \bullet \Delta \dot{I}_3 \quad (11).$$

Consequently, four equations (8) to (14) are available for determining the unknown values $L_1$, $L_2$, $L_3$ and $U_S$. Each of the inductivities $L_1$, $L_2$, $L_3$ may serve as a dimension for the position of the rotor within half a magnetic period.

It is understood that for obtaining several equations from which $U_S$ can be eliminated and $L_1$, $L_2$ or/and $L_3$ can be determined, several successive switching state changes can be considered as long as the condition is adhered to that over the total duration of the measurements the position of the rotor does not perceptibly change. Under these conditions, $\Delta i$ does not have to be determined in all three phase strands. When considering several switching state changes, the measurement of $\Delta\dot{I}$ in a single phase strand may be sufficient. Accordingly, only a single measuring device is required.

Figure 3:
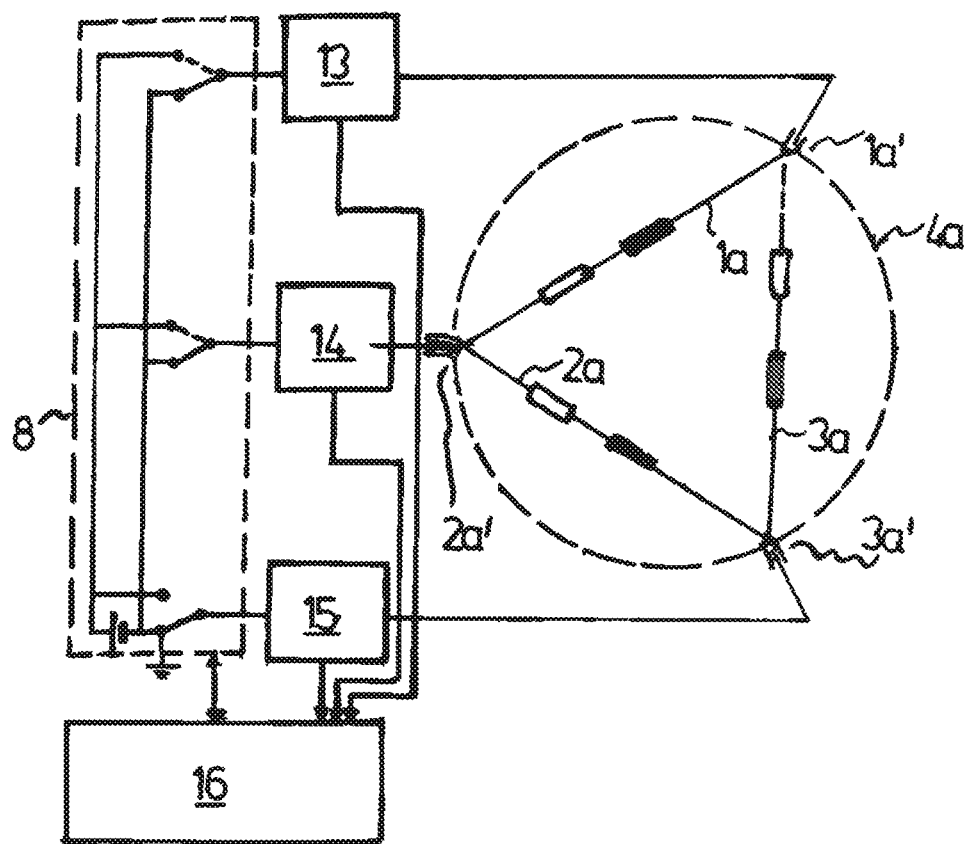
FIG. 3 shows a schematic illustration of an electrical machine with phase strands switched in a triangular configuration, and devices for determining the position of the rotor in accordance with the method according to the invention.

Equations for determining $L_1$, $L_2$, or/and $L_3$ can also be set up for the situation in which the phase strands 1, 2, 3 are switched in a triangular configuration, as illustrated in FIG. 3.

A first switching state change concerns, for example, switching of the connection 1a' from the voltage zero point to battery voltage $U_B$. A second switching state change concerns the switching of the connection 2a' from the voltage zero point to battery voltage $U_B$. This results in the three equations $$\Delta\dot{i}_2 \bullet L_1 = U_B \quad (12)$$

$$\Delta\dot{i}_3 \bullet L_3 = U_B \quad (13)$$

$$\Delta\dot{i}_3 \bullet L_2 = U_B \quad (14),$$

from which the unknown values $L_1$, $L_2$, $L_3$ can be determined.

The measuring devices (13) to (15) in the embodiment according to FIG. 2 determine, or at least one such measuring device determines, a voltage signal S representative for the time derivation $\dot{I}$ of the current I in the respective current supply line, wherein the voltage signal is supplied to the evaluating device 16. Control signals received through the control line 17 and indicated by the switching devices 9 to 11 permit the determination of S prior to and after switching, and thus the determination of signal $\Delta S$ which is representative for $\Delta\dot{I}$. The evaluating device 16 determines from the signals $\Delta S$, for example, with the aid of the above mentioned equations, the signals representative for the position of the rotor.

The above described method for determining the position could be combined with the known method which is based on the evaluation of the potential $U_S$ at the star point.

The primary winding 20 of the measuring device shown in FIG. 2 may result in an advantageous damping effect during the switching procedures.

From the determined inductivities $L_1$, $L_2$, $L_3$, a flow vector can be determined whose direction coincides with the direction of the rotor flow vector $\Phi_R$ produced by the magnetic field of the rotor and which is proportional to the rotor flow vector $\Phi_R$ as long as the currents $I_1$, $I_2$, $I_3$ flowing in the phase strands do not significantly influence the total flow vector $\Phi$. The latter may be the case, especially when the rotor field is weak and the air gap is large. In addition to the rotor flow vector $\Phi_R$ which is a function of $L_1$, $L_2$, $L_3$, the stator flow vector $\Phi_S$, which depends on the currents $I_1$, $I_2$, $I_3$, are determinative for the total flow vector $\Phi$:

$$\Phi(L_1, L_2, L_3) = \Phi_R + \Phi_S(I_1, I_2, I_3) \quad (15).$$

Consequently, in the case of known inductivities $L_1$, $L_2$, $L_3$ and known currents $I_1$, $I_2$, $I_3$, the rotor flow vector $\Phi_R$ can be computed:

$$\Phi_R = \Phi(L_1, L_2, L_3) - \Phi_S(I_1, I_2, I_3) \quad (16).$$

When the rotor flow vector $\Phi_R$ is known then the rotary position of the rotor is also known.

The currents $I_1$, $I_2$, $I_3$ can be measured. However, they can also be computed if the inductivities $L_1$, $L_2$, $L_3$ are known, if the values $\dot{I}_1$, $\dot{I}_2$, $\dot{I}_3$ are known (by measuring $\Delta\dot{I}_1$), if the resistances $R_1$, $R_2$, $R_3$ are known, and if the induced voltages $U_{1\_ind}$, $U_{2\_ind}$, $U_{3\_ind}$ are known. They can also be computed by means of the above indicated equations.

The voltages $U_{i\_ind}$ result from the components $\Phi_i$ of the total flow vector $\Phi$ multiplied with the determined rotary speed of the rotor.

The invention claimed is:

1. A method for determining a position of a rotor of an electrical machine having several phase strands, in relation to a stator, the method comprising the steps of: determining for at least one of a plurality of current supply inputs of the electrical machine, a change ($\Delta \dot{I}$) of a time derivation ($\dot{I}$) of current (I) flowing through the current supply input as a result of a change ($\Delta U$) of a potential (U) on at least one of the current supply inputs; wherein the change ($\Delta U$) of the potential (U) takes place over such a short period of time that neither voltages ($U_{1\_ind}$, $U_{2\_ind}$, $U_{3\_ind}$) induced in the phase strands nor the currents ($I_1$, $I_2$, $I_3$) flowing through the current supply inputs change noticeably; and, determining a measurement signal representative for the position of the rotor from several changes ($\Delta \dot{I}$) obtained simultaneously or successively.

2. The method according to claim 1, including determining as the representative measurement signal a present inductivity ($L_1$, $L_2$, $L_3$) of at least one of the phase strands and/or a quotient of these inductivities.

3. The method according to claim 1, wherein the phase strands are switched in a star configuration and/or a triangular configuration.

4. The method according to claim 1, wherein the change ($\Delta U$) of the potential (U) takes place from a potential zero point to a direct voltage or vice versa.

5. The method according to claim 4, wherein the direct voltage is a battery voltage $U_B$.

6. The method according to claim 1, wherein the change ($\Delta U$) of the potential (U) takes place within a scope of a current supply of the electrical machine by pulse width modulation (PWM).

7. The method according to claim 1, including determining the change ($\Delta i$) with a measuring transformer that delivers a voltage signal which may have to be reinforced.

8. The method according to claim 1, including determining several changes ($\Delta \dot{I}$) caused by several potential changes ($\Delta U$) for one of the current supply inputs or by changes ($\Delta \dot{I}$) caused by a single potential change ($\Delta U$) at several current supply inputs.

9. The method according to claim 2, including determining the representative signal from a sum of voltage components over the individual phase strands prior to and after equations containing potential changes.

10. The method according to claim 9, including determining a present total flow vector ($\Phi$) from the present inductivities ($L_1$, $L_2$, $L_3$) and determining from the present currents ($I_1$, $I_2$, $I_3$) flowing through the current supply inputs a vector component ($\Phi_S$) of the total flow ($\Phi$) produced by these currents, and determining a rotor flow vector ($\Phi_R$) by subtracting the vector component ($\Phi_S$) from the total flow ($\Phi$).

11. The method according to claim 10, wherein the present currents ($I_1$, $I_2$, $I_3$) are computed from the inductivities ($L_1$, $L_2$, $L_3$), resistances ($R_1$, $R_2$, $R_3$) of the phase strands, voltages ($U_{1\_ind}$, $U_{2\_ind}$, $U_{3\_ind}$) induced in the phase strands and from measured time derivations ($\dot{I}_1$, $\dot{I}_2$, $\dot{I}_3$) of the currents ($I_1$, $I_2$, $I_3$), and the voltages ($U_{1\_ind}$, $U_{2\_ind}$, $U_{3\_ind}$) are determined from the components ($\Phi_1$) of the total flow vector ($\Phi$) multiplied with a measured speed of rotation of the rotor.

12. An apparatus for determining a position of a rotor of an electrical machine having several phase strands, in relation to a stator, comprising: devices on at least one of a plurality of current supply inputs of the electrical machine, for determining a change ($\Delta \dot{I}$) of a time derivation ($\dot{I}$) caused by a change ($\Delta U$) of a potential (U) on at least one of the current supply inputs of current (I) flowing through the respective current supply input; and an evaluating device for determining a measurement signal representative for the position of the rotor from several changes ($\Delta \dot{I}$) measured simultaneously or successively, wherein the change ($\Delta U$) of the potential (U) takes place over such a short period of time that neither voltages ($U_{1\_ind}$, $U_{2\_ind}$, $U_{3\_ind}$) induced in the phase strands nor the currents ($I_1$, $I_2$, $I_2$) flowing through the current supply inputs change noticeably.

* * * * *